(12) United States Patent
Morgan et al.

(10) Patent No.: US 9,869,837 B2
(45) Date of Patent: Jan. 16, 2018

(54) HEAT DISSIPATING COMMUNICATION SYSTEM

(71) Applicant: TYCO ELECTRONICS CORPORATION, Berwyn, PA (US)

(72) Inventors: Chad William Morgan, Carneys Point, NJ (US); Nancy L. Reeser, Lemoyne, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 29 days.

(21) Appl. No.: 14/961,977

(22) Filed: Dec. 8, 2015

(65) Prior Publication Data

US 2017/0164518 A1 Jun. 8, 2017

(51) Int. Cl.
*H01R 12/72* (2011.01)
*G02B 6/43* (2006.01)
*G06F 1/18* (2006.01)

(52) U.S. Cl.
CPC .............. *G02B 6/43* (2013.01); *G06F 1/181* (2013.01); *H01R 12/724* (2013.01)

(58) Field of Classification Search
CPC . H05K 7/20154; H05K 7/20409; H05K 1/021
USPC .......................... 439/485, 487; 361/704, 703
See application file for complete search history.

(56) References Cited

U.S. PATENT DOCUMENTS

| 5,256,080 | A * | 10/1993 | Bright | H01R 13/193 439/259 |
| 6,816,376 | B2 * | 11/2004 | Bright | G02B 6/4201 165/185 |
| 7,539,018 | B2 * | 5/2009 | Murr | H05K 7/20418 165/185 |
| 8,535,096 | B1 * | 9/2013 | Shirk | H01R 13/648 439/374 |
| 9,389,368 | B1 * | 7/2016 | Sharf | H01R 27/00 |
| 2007/0253168 | A1 * | 11/2007 | Miller | G02B 6/4246 361/719 |
| 2009/0258534 | A1 * | 10/2009 | Bright | G02B 6/0008 439/490 |
| 2011/0294313 | A1 * | 12/2011 | Cina | H01R 12/73 439/78 |
| 2012/0021654 | A1 * | 1/2012 | Westman | H01R 12/724 439/682 |
| 2012/0250735 | A1 * | 10/2012 | Tang | G06F 13/409 375/219 |
| 2012/0257355 | A1 * | 10/2012 | Yi | G02B 6/4269 361/704 |

(Continued)

*Primary Examiner* — Tulsidas C Patel
*Assistant Examiner* — Marcus Harcum

(57) ABSTRACT

A communication system includes a receptacle cage and a circuit board. The receptacle cage has walls defining a port that is configured to receive a pluggable module therein. The receptacle cage houses a communication connector configured to electrically connect to the pluggable module. The receptacle cage and the communication connector therein are both mounted on a top face of the circuit board. The circuit board defines at least one opening through the circuit board in a port mounting area that aligns with the port of the receptacle cage. The at least one opening is configured to receive heat dissipating fins therethrough that transfer heat from the pluggable module in the port through the circuit board to a cooling fluid beyond a bottom face of the circuit board.

20 Claims, 6 Drawing Sheets

(56) References Cited

U.S. PATENT DOCUMENTS

| 2013/0210269 A1* | 8/2013 | Neer | G02B 6/4246 |
| | | | 439/487 |
| 2013/0237092 A1* | 9/2013 | Rubens | H01R 13/6596 |
| | | | 439/607.23 |
| 2015/0342090 A1* | 11/2015 | Yang | H05K 7/20418 |
| | | | 361/707 |

* cited by examiner

HEAT DISSIPATING COMMUNICATION SYSTEM

BACKGROUND OF THE INVENTION

The subject matter described herein relates to a communication system that includes a receptacle assembly mounted on a circuit board.

At least some known communication systems include receptacle assemblies, such as input/output (I/O) connector assemblies, that are configured to receive a pluggable module and establish a communicative connection between the pluggable module and an electrical connector of the receptacle assembly. As one example, a known receptacle assembly includes a receptacle housing that is mounted to a circuit board and configured to receive a small form-factor (SFP) pluggable transceiver. The receptacle assembly includes an elongated cavity that extends between an opening of the cavity and an electrical connector that is disposed within the cavity and mounted to the circuit board. The pluggable module is inserted through the opening and advanced toward the electrical connector in the cavity. The pluggable module and the electrical connector have respective electrical contacts that engage one another to establish a communicative connection.

One challenge often encountered in the design of the pluggable module and receptacle assembly is the heat generated during operation of the communication system, which negatively affects system reliability and electrical performance. Typically, heat is generated by components on an internal circuit board within the pluggable module, and the heat is drawn away from the internal circuit board by a metal body of the pluggable module. In some cases, a heat sink is used to dissipate the heat from the pluggable module into air flowing through and around the receptacle assembly. The heat sink is disposed along a top of the receptacle housing or along a top of the metal body of the pluggable module due to space constraints and a lack of air flowing around other portions of the receptacle housing and/or pluggable module that is attributable at least in part to the printed circuit board. But, in typical pluggable modules, the internal circuit board is disposed at or proximate to a bottom wall of the metal body, so heat from the internal circuit board is absorbed by the metal body at the bottom wall. The heat is transferred from the bottom wall along sides of the metal body and then along the top of the metal body prior to reaching the heat sink, which is a long, heat-resistive path resulting in diminished heat transfer capabilities. As data throughput speeds of the pluggable modules increase, more heat is generated. Conventional designs are proving to be inadequate for the required heat transfer.

Accordingly, there is a need for a pluggable module for use in a communication system that allows significant heat transfer.

BRIEF DESCRIPTION OF THE INVENTION

In an embodiment, a communication system is provided including a receptacle cage and a circuit board. The receptacle cage has a plurality of walls defining a port that is configured to receive a pluggable module therein through a front end of the receptacle cage. The receptacle cage houses a communication connector at least proximate to a rear end of the receptacle cage. The communication connector is configured to be electrically connected to the pluggable module received in the port. The circuit board has a top face and an opposite bottom face. The receptacle cage is mounted on the top face of the circuit board. The communication connector within the receptacle cage is mounted on the top face and electrically connected to the circuit board. The circuit board defines at least one opening through the circuit board in a port mounting area that aligns with the port of the receptacle cage such that the pluggable module received in the port is disposed above the at least one opening. The at least one opening is configured to receive thermally-conductive heat dissipating fins therethrough that transfer heat from the pluggable module through the circuit board to a cooling fluid beyond the bottom face of the circuit board.

In another embodiment, a communication system is provided including a circuit board, a receptacle cage, and a heat sink member. The circuit board has a top face and an opposite bottom face. The circuit board defines at least one opening extending through the circuit board in a port mounting area of the circuit board. The receptacle cage is mounted on the top face of the circuit board. The receptacle cage has a plurality of walls defining a port that is configured to receive a pluggable module therein through a front end of the receptacle cage. The port aligns with the port mounting area of the circuit board such that the pluggable module is received in the port above the at least one opening in the circuit board. The receptacle cage houses a communication connector at least proximate to a rear end of the receptacle cage. The communication connector is configured to be electrically connected to the pluggable module received in the port. The heat sink member is within the port of the receptacle cage. The heat sink member includes a base plate having an interface surface and an opposite fin surface. The heat sink member has thermally-conductive heat dissipating fins protruding from the fin surface. The heat sink member is mounted to the top face of the circuit board such that the heat dissipating fins extend through the at least one opening of the circuit board beyond the bottom face of the circuit board. The interface surface engages and thermally couples to a bottom of the pluggable module received in the port for the heat sink member to transfer heat received from the pluggable module through the circuit board to a cooling fluid beyond the bottom face of the circuit board.

In another embodiment, a communication system is provided including a circuit board, a receptacle cage, and a pluggable module. The circuit board has a top face and an opposite bottom face. The circuit board defines at least one opening through the circuit board that extends rearward from a front edge of the circuit board in a port mounting area of the circuit board. The receptacle cage is mounted on the top face of the circuit board. The receptacle cage has a plurality of walls defining a port that aligns with the port mounting area of the circuit board. The receptacle cage houses a communication connector at least proximate to a rear end of the receptacle cage. The pluggable module is received in the port of the receptacle cage through a front end thereof. The pluggable module is configured to be electrically connected to the communication connector. The pluggable module has an internal circuit card held in a shell. The shell includes heat dissipating fins that extend from a bottom of the shell. The heat dissipating fins are elongate blades that extend parallel to one another along at least a portion of a length of the pluggable module between a mating end and a cable end of the shell. As the pluggable module is loaded into the port in a mating direction from the front end of the receptacle cage, the elongate blades are received in the at least one opening of the circuit board. Distal tips of the elongate blades protrude beyond the bottom face of the circuit board to transfer heat from the pluggable module through the circuit board to a cooling fluid beyond the bottom face of the circuit board.

DETAILED DESCRIPTION OF THE INVENTION

Embodiments set forth herein include communication systems that facilitate significant thermal heat dissipation or transfer for the components thereof. Various embodiments of the communication system provide heat transfer from a pluggable body of the communication system through a circuit board of the communication system to dissipate the heat along a side of the circuit board opposite to the side that faces the pluggable body.

Heat-generating electrical components within the pluggable module are typically located proximate to a bottom of the pluggable module. Unlike conventional communication systems that use a shell of the pluggable module to direct the heat generated within the pluggable module along sides of the shell to a top of the shell where the shell is exposed to some cooling air flow, embodiments set forth herein direct the heat from the bottom of the pluggable module through the circuit board to cooling airflow on the opposite side or face of the circuit board. For example, embodiments of the communication system described herein include heat dissipating fins in thermal engagement with the pluggable module that extend through openings in the circuit board to transfer heat to a cooling fluid along the opposite side of the circuit board. More heat may be dissipated than conventional systems because the heat dissipating fins define a shorter (and therefore less heat resistive) path from the heat-generating components within the pluggable module to the cooling fluid than the conventional systems that direct the heat along the sides and the top of the shell of the pluggable module.

Figure 1:
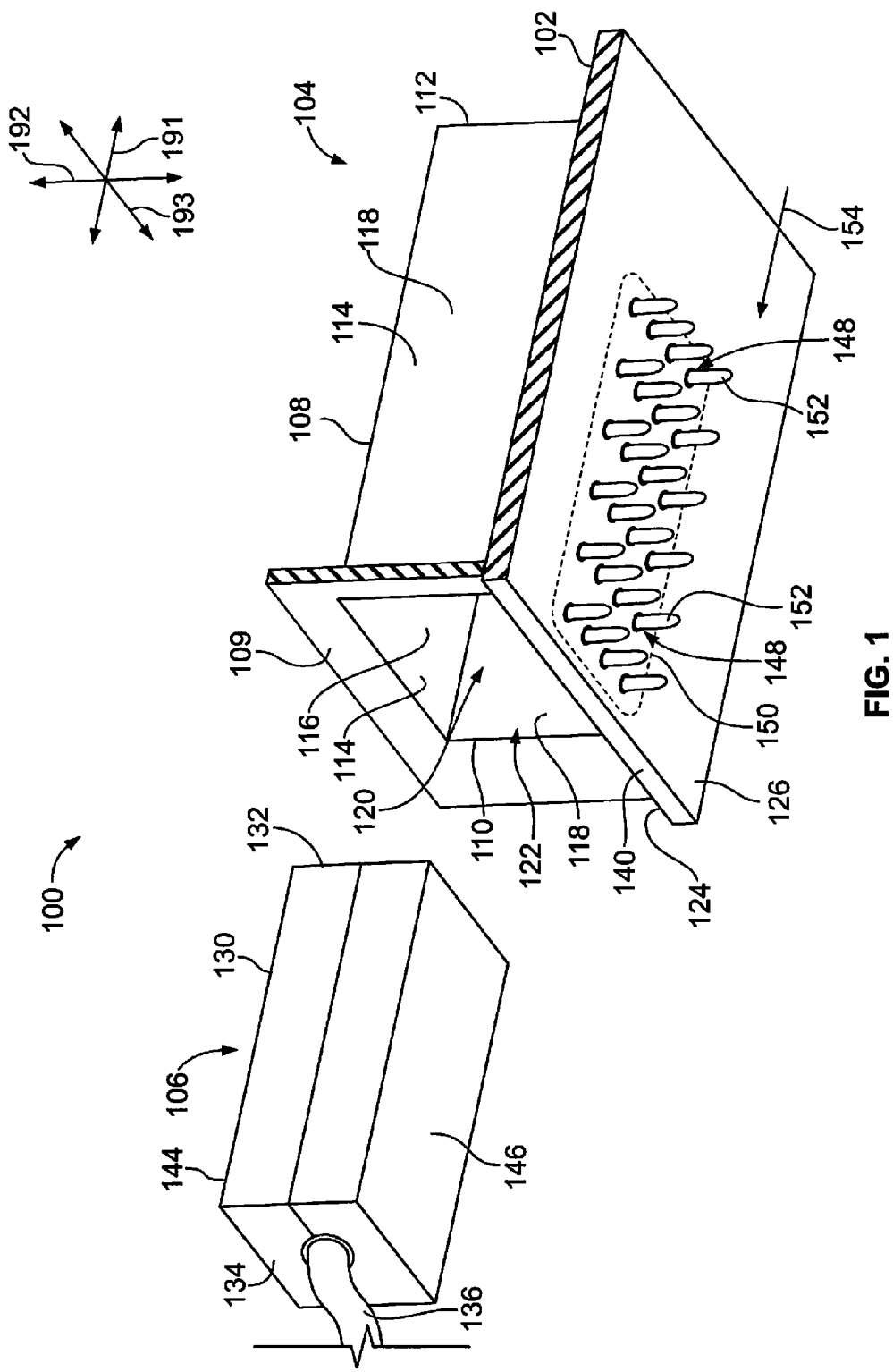
FIG. 1 is a perspective view of a communication system in accordance with an embodiment.

FIG. 1 is a perspective view of a communication system 100 in accordance with an embodiment. The communication system 100 includes a circuit board 102, a receptacle assembly 104 mounted to the circuit board 102, and a pluggable module connector 106 (referred to herein as pluggable module 106) that is configured to communicatively engage the receptacle assembly 104. The communication system 100 is oriented with respect to a mating or insertion axis 191, an elevation axis 192, and a lateral axis 193. The axes 191-193 are mutually perpendicular. Although the elevation axis 192 appears to extend in a vertical direction parallel to gravity in FIG. 1, it is understood that the axes 191-193 are not required to have any particular orientation with respect to gravity.

The communication system 100 may be part of or used with telecommunication and/or data communication systems or devices. For example, the communication system 100 may be part of or include a switch, router, server, hub, network interface card, or storage system. The circuit board 102 may be a daughter card or a mother board. The circuit board includes conductive traces (not shown) embedded in one or more dielectric substrate layers. The circuit board 102 includes a top face 124 and an opposite bottom face 126.

The pluggable module 106 may be an input/output (I/O) module configured to be inserted into and removed from the receptacle assembly 104. In the illustrated embodiment, the pluggable module 106 is configured to transmit data signals in the form of electrical signals and/or optical signals. For example, the pluggable module 106 may be configured to receive electrical data signals and convert the electrical data signals into optical data signals, or vice-versa. In some embodiments, the pluggable module 106 is a small form-factor pluggable (SFP) transceiver or quad small form-factor pluggable (QSFP) transceiver. The pluggable module 106 may satisfy certain technical specifications for SFP or QSFP transceivers, such as Small-Form Factor (SFF)-8431. In some embodiments, the pluggable module 106 is configured to transmit data signals up to 2.5 gigabits per second (Gbps), up to 5.0 Gbps, up to 10.0 Gbps, up to 25.0 Gbps, or more. By way of example, the receptacle assembly 104 and the pluggable module 106 may be similar to the receptacle cages and transceivers, respectively, which are part of the SFP+ product family available from TE Connectivity. In other embodiments, the pluggable module 106 may satisfy technical protocols and specifications for other form factors, such as microQSFP or the like.

The receptacle assembly 104 includes a receptacle cage 108 that is mounted to the circuit board 102. The receptacle cage 108 may also be referred to as a receptacle housing. The receptacle cage 108 may be positioned at a panel or faceplate 109 of a case (not shown) of the telecommunication and/or data communication system or device such that the receptacle cage 108 is interior of the case and corresponding faceplate 109. The pluggable module 106 may be loaded into the receptacle cage 108 from outside or exterior of the case and corresponding faceplate 109.

The receptacle cage 108 includes a front end 110 and an opposite rear end 112. The front end 110 may be provided at, and extend at least partially through, an opening in the faceplate 109. The front end 110 of the receptacle cage 108 is located at or proximate to a front edge 140 of the circuit board 102. The mating axis 191 may extend between the front and rear ends 110, 112. Relative or spatial terms such as "front," "back," "first," "second," "top," or "bottom" are only used to distinguish the referenced elements in the communication system 100 and do not necessarily require particular positions or orientations relative to the surrounding environment of the communication system 100. For example, the front end 110 may face or be located in a back portion of a larger telecommunication and/or data communication system. In some applications, the front end 110 of the receptacle cage 108 is viewable to a user when the user is inserting the pluggable module 106 into the receptacle assembly 104.

The receptacle cage 108 is configured to contain or block electromagnetic interference (EMI) and guide the pluggable module 106 during a mating operation. To this end, the receptacle cage 108 includes a plurality of walls 114 that are interconnected with one another to form the receptacle cage 108. The walls 114 define a port 120 that is configured to receive the pluggable module 106 therein. The port 120 extends from a port opening 122 at the front end 110 of the receptacle cage 108 towards the rear end 112. In the illustrated embodiment, the walls 114 include a top wall 116 and side walls 118. The side walls 118 each extend from the top wall 116 downwards to the circuit board 102. The side walls 118 are each secured to the top face 124 of the circuit board 102. The port 120 may be defined laterally between the side walls 118 and vertically between the top wall 116 and the top face 124 of the circuit board 102.

The walls 114 may be formed from an electrically and thermally conductive material, such as sheet metal and/or a polymer having conductive particles. In the illustrated embodiment, the walls 114 are stamped and formed from a metal material, such as sheet metal. Optionally, the receptacle cage 108 may be configured to facilitate some airflow through the receptacle cage 108 to transfer heat (or thermal energy) away from the receptacle assembly 104 and the pluggable module 106.

Although not shown in FIG. 1, the receptacle assembly 104 includes a communication connector 142 (shown in FIG. 3) housed within the receptacle cage 108 at least proximate to the rear end 112 of the receptacle cage 108. The communication connector 142 is mounted on and electrically connected to the circuit board 102. The communication connector 142 is configured to mate with the pluggable module 106 received in the port 120 to electrically connect the pluggable module 106 to the circuit board 102. Thus, the communication connector 142 provides a conductive signal pathway between the pluggable module 106 and the circuit board 102. The metal walls 114 of the receptacle cage 108 provide EMI shielding for the pluggable module 106 and the communication connector 142 therein.

In alternative embodiments, the receptacle cage 108 defines multiple ports that are arranged side-by-side and/or stacked vertically. Each port is configured to receive one pluggable module 106. In such embodiments, the receptacle assembly 104 may have multiple communication connectors 142 (shown in FIG. 3) that each have one or multiple mating interfaces for electrically connecting to one or multiple pluggable modules, respectively.

The pluggable module 106 has a shell or body 130. The shell 130 includes a mating end 132 and an opposite cable end 134. A cable 136 is coupled to the shell 130 at the cable end 134. In FIG. 1, the mating end 132 is configured to be inserted into the port opening 122 of the receptacle cage 108 and advanced in a mating direction along the mating axis 191 through the port 120. The shell 130 defines a cavity 138 (shown in FIG. 3) in which one or more heat-generating components are disposed and held in place. The shell 130 is composed of a thermally-conductive material in order to provide heat transfer for the heat-generating components within the cavity 138 as described in more detail with reference to FIG. 3. The shell 130 includes a top 144 and a bottom 146. As the pluggable module 106 is loaded into the port 120, the bottom 146 faces the top face 124 of the circuit board 102.

In an exemplary embodiment, the circuit board 102 defines at least one opening 148 through the circuit board 102. The at least one opening 148 extends through the circuit board 102 between the top face 124 and the bottom face 126. The at least one opening 148 is located in a port mounting area 150 of the circuit board 102. The port mounting area 150 aligns with the port 120 of the receptacle cage 108 when the receptacle cage 108 is mounted on the circuit board 102. For example, when the pluggable module 106 is received in the port 120, the pluggable module 106 is disposed above the at least one opening 148 in the circuit board 102. The at least one opening 148 is sized, shaped, located, and oriented to receive thermally-conductive heat dissipating fins 152 therethrough. The heat dissipating fins 152 extend through the at least one opening 148 and protrude beyond the bottom face 126 of the circuit board 102 as shown. For example, the circuit board 102 may define a single opening 148 that receives all of the heat dissipating fins 152 therethrough, or the circuit board 102 may define multiple openings 148 that each receive one or more of the heat dissipating fins 152.

Although not shown in FIG. 1, the heat dissipating fins 152 are configured to thermally couple to the bottom 146 of the pluggable module 106 along the top face 124 of the circuit board 102. As used herein, terms such as "thermally couple" and "thermal engagement" indicate that a conductive heat path extends between two (or more) components resulting from direct mechanical engagement between the two components or indirect mechanical engagement via an intervening thermally-conductive layer or member. Therefore, the heat dissipating fins 152 are configured to transfer heat from the pluggable module 106 through the at least one opening 148 in the circuit board 102 to a cooling fluid 154 along and/or below the bottom face 126 of the circuit board 102. The cooling fluid 154 may be an air stream. Fans or other air moving devices may be used to increase airflow along the bottom face 126 of the circuit board 102.

Instead of routing the heat that is generated proximate to the bottom 146 of the pluggable module 106 around sides of the shell 130 to the top 144 of the shell 130 and/or the top wall 116 of the receptacle cage 108 in order to access a cooling fluid for absorbing the heat, as is done in conventional systems, the embodiments described herein route the heat from the bottom 146 of the pluggable module 106 through the at least one opening 148 in the circuit board 102 to access the cooling fluid 154 along the bottom face 126 of the circuit board 102. In an embodiment in which the circuit board 102 is one of multiple daughter cards stacked side by side and mounted to a common mother board, the cooling fluid 154 may flow in gaps that separate adjacent daughter cards.

Figure 2:
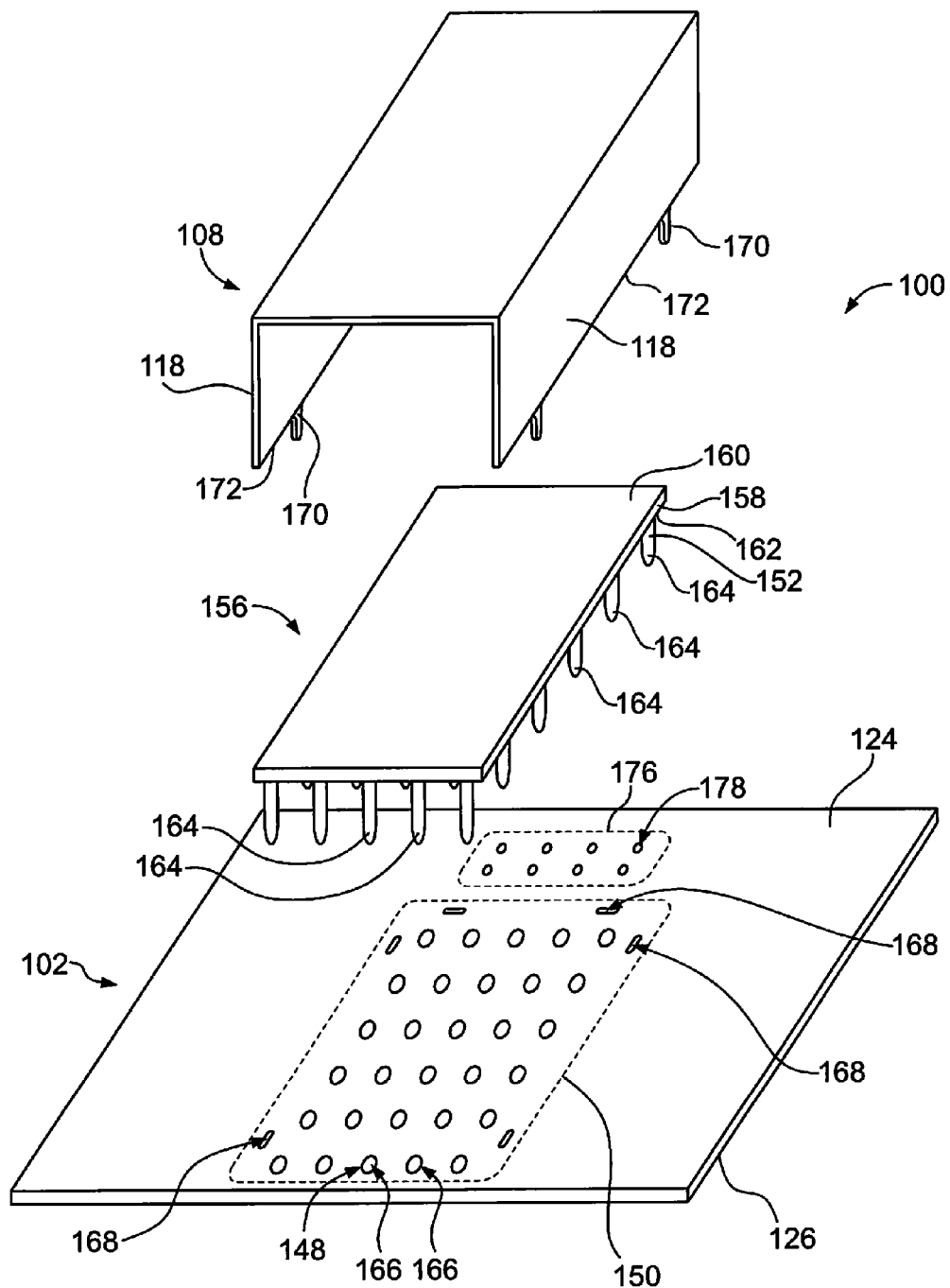
FIG. 2 is an exploded perspective view of the communication system shown without a pluggable module or a communication connector.
Figure 3:
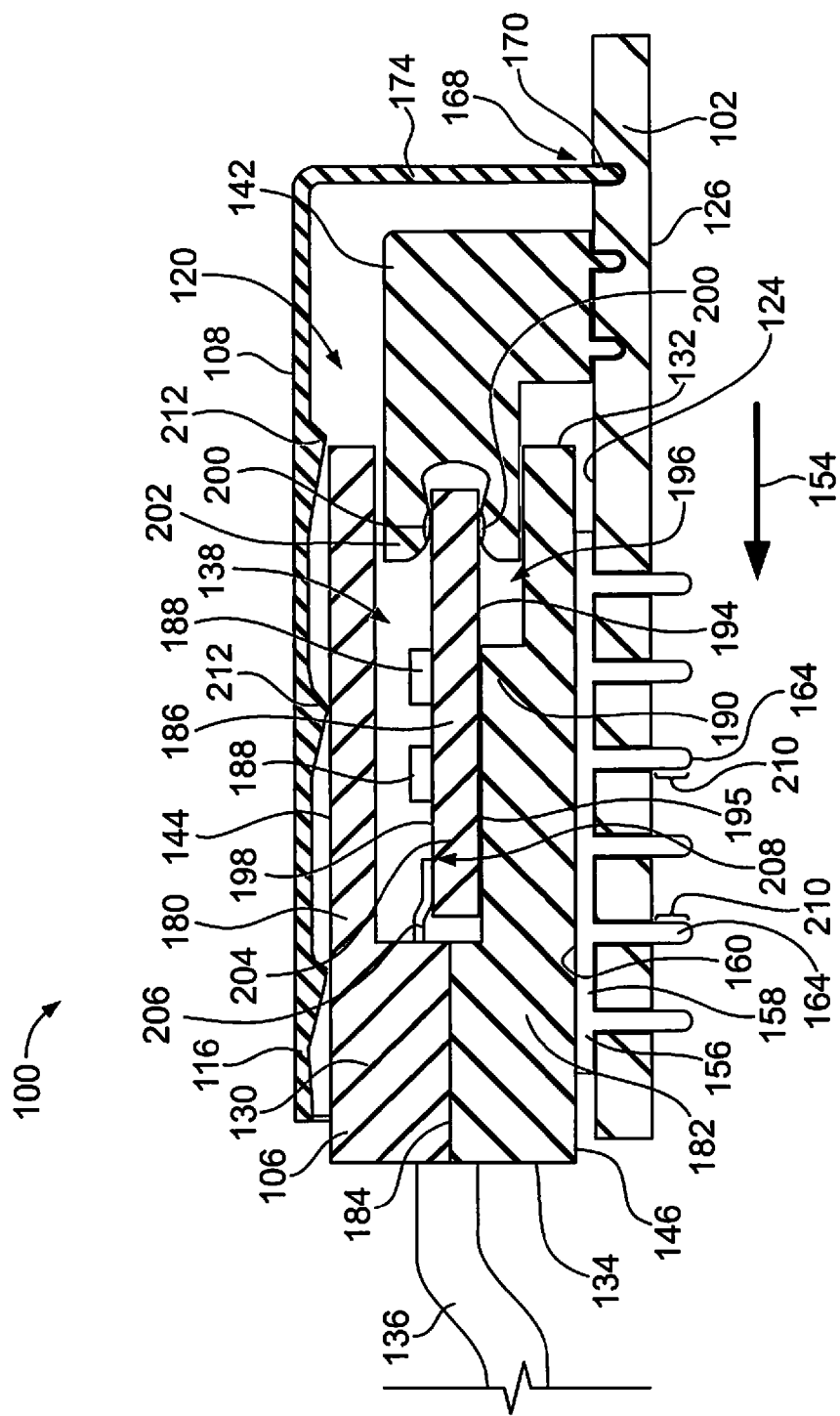
FIG. 3 is a side cross-sectional view of the communication system showing the pluggable module loaded in a port and electrically connected to the communication connector according to an embodiment.

FIG. 2 is an exploded perspective view of the communication system 100 shown without the pluggable module 106 (shown in FIG. 1) or the communication connector 142 (FIG. 3). The top face 124 of the circuit board 102 is visible in FIG. 2. The receptacle cage 108 is floating above the circuit board 102. In an exemplary embodiment, the communication system 100 further includes a heat sink member 156. The heat sink member 156 includes the heat dissipating fins 152 shown in FIG. 1. The heat sink member 156 is configured to be mounted to the top face 124 of the circuit board 102 within the port 120 (shown in FIG. 1) that is defined by the receptacle cage 108 and the circuit board 102. The fins 152 of the heat sink member 156 extend through multiple openings 148 in the circuit board 102 beyond the bottom face 126 thereof.

The heat sink member 156 includes a base plate 158 that has an interface surface 160 and an opposite fin surface 162. The interface and fin surfaces 160, 162 of the base plate 158 are planar and extend parallel to each other in the illustrated embodiment. The heat dissipating fins 152 protrude from the fin surface 162 of the base plate 158. The heat dissipating fins 152 are arranged in an array along the fin surface 162. The heat sink member 156 is formed of a thermally conductive material, such as metal or a polymer with metal flakes or other particles embedded therein. Some example metals that may form the heat sink member 156 are copper and aluminum, each either alone or in an alloy. In an embodiment, the heat sink member 156 has a one-piece, unitary construction such that the fins 152 are integrally attached to the base plate 158. The heat sink member 156 may be formed by a casting process, an extrusion, a machining process, a molding process, or the like, depending at least in part on the thermally conductive material used. In an alternative embodiment, the fins 152 may not be integral to the base plate 158 such that the fins 152 are attached to the base plate 158 subsequent to formation by soldering, laser-welding, or another fusing or joining process.

Figure 5:
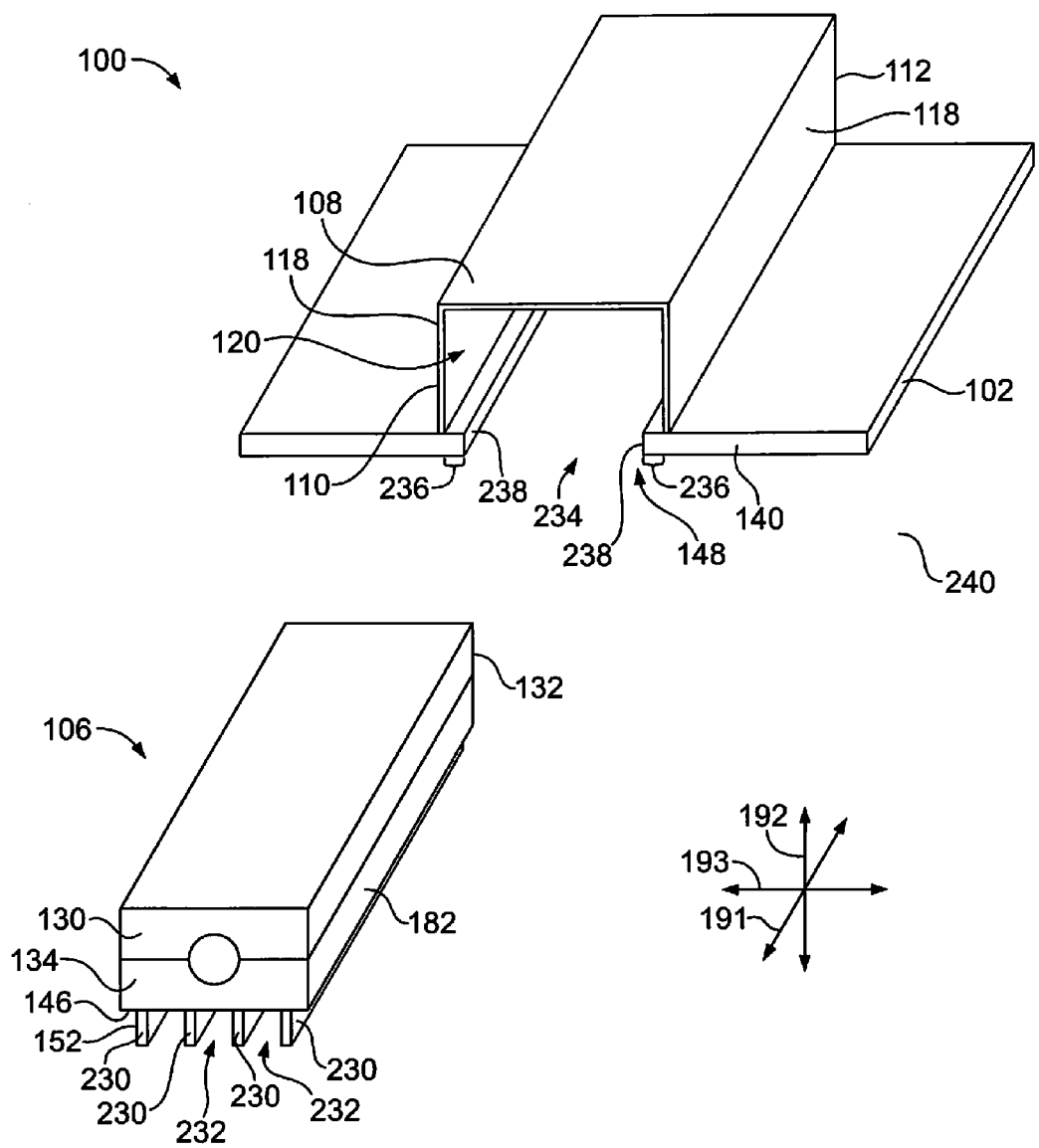
FIG. 5 is a perspective view of an alternative embodiment of the communication system.

In the illustrated embodiment, the heat dissipating fins 152 of the heat sink member 156 are an array of pin fins 164. The pin fins 164 are posts or rods. The pin fins 164 are shown as having cylindrical shapes, but the pin fins 164 may have other shapes in other embodiments. The pin fins 164 may have identical or at least similar shapes and sizes relative to one another. The pin fins 164 also may extend from the base plate 158 in the same direction such that the pin fins 164 are parallel to one another. For example, the pin fins 164 may extend perpendicular to the planar fin surface 162. To accommodate the pin fins 164, the openings 148 in the circuit board 102 are complementary pin holes 166. For example, each pin hole 166 is sized and located to receive one (and only one) corresponding pin fin 164. The pin holes 166 may be circular or have other round shapes. Each pin hole 166 may be sized with a cross-sectional area that is at least slightly larger than the cross-sectional area of the corresponding pin fin 164 received in the hole 166 such that the circuit board 102 does not mechanically engage the pin fins 164. Such mechanical engagement may provide a thermally conductive path from the pin fins 164 to the circuit board 102 which could potentially divert some heat to the circuit board instead of dissipating the heat to the cooling fluid 154 (shown in FIG. 1). Although pin fins 164 are shown in FIG. 2, in other embodiments the fins 152 may have other shapes, such as elongate blades as shown in FIG. 5 below.

The pin holes 166 of the circuit board 102 are arranged in the port mounting area 150. The port mounting area 150 of the circuit board 102 may also include vias or thru-holes 168 along the perimeter of the port mounting area 150. The thru-holes 168 are configured to receive mounting tails 170 of the receptacle cage 108 for mounting the receptacle cage 108 to the circuit board 102. The mounting tails 170 may extend from panel edges 172 of the side walls 118 of the receptacle cage 108. Optionally, the mounting tails 170 may electrically connect to the circuit board 102 via the thru-holes 168, such as to provide a ground path between the receptacle cage 108 and the circuit board 102. As shown in FIG. 3, the receptacle cage 108 may also include a back wall 174, and the back wall 174 may include at least one mounting tail 170 that is configured to be received in a corresponding thru-hole 168. In addition to the port mounting area 150, the circuit board 102 also defines a connector mounting area 176 that is rearward of the port mounting area 150. The connector mounting area 176 includes at least one of vias or contact pads for electrically connecting the communication connector 142 (shown in FIG. 3) to the circuit board 102. In the illustrated embodiment, the circuit board 102 defines vias 178 in the connector mounting area 176.

FIG. 3 is a side cross-sectional view of the communication system 100 showing the pluggable module 106 loaded in the port 120 and electrically connected to the communication connector 142 according to an embodiment. In an embodiment, the shell 130 of the pluggable module 106 is formed by a first shell member 180 and a second shell member 182 that engage one another at a seam 184. The first shell member 180 may define the top 144 of the shell 130, and the second shell member 182 may define the bottom 146 of the shell 130. The first shell member 180 is referred to hereinafter as upper shell member 180, and the second shell member 182 is referred to hereinafter as lower shell member 182. Both of the upper and lower shell members 180, 182 extend the length of the shell 130 and define respective portions of the mating end 132 and the cable end 134. The shell members 180, 182 define the cavity 138 therebetween.

The pluggable module 106 has an internal circuit card 186 held in the cavity 138 of the shell 130. The internal circuit card 186 includes one or more electrical components 188 disposed thereon. The electrical components 188 generate heat during use. The shell 130 is formed of a thermally-conductive material in order to absorb heat from the internal circuit card 186 and transfer the heat to the bottom 146 of the shell 130. For example, the upper shell member 180 and/or lower shell member 182 may be formed of a thermally conductive metal, such as aluminum, copper, or the like. Alternatively, the upper shell member 180 and/or lower shell member 182 may be formed of a thermally conductive polymer compound that includes a dielectric material with metal flakes or other particles embedded therein. In the illustrated embodiment, the internal circuit card 186 is held on a platform 190 of the lower shell member 182. The lower shell member 182 is thermally coupled to the internal circuit card 186 via mechanical engagement between the platform 190 and a bottom side 195 of the internal circuit card 186.

A mating segment 194 of the internal circuit card 186 projects beyond the platform 190 into a socket 196 defined by the shell 130. The platform 190 defines a back wall of the socket 196. The mating segment 194 may include contact pads (not shown) or other electrical contacts that are configured to engage and electrically connect to electrical contacts 200 of a mating interface 202 of the communication connector 142. As shown in the illustrated embodiment, the electrical contacts 200 may be configured to engage both a top side 198 and the bottom side 195 of the internal circuit card 186. The mating interface 202 is received in the socket 196 when the pluggable module 106 is fully loaded in the port 120.

A cable segment 204 of the internal circuit card 186 is electrically connected to electrical wires 206 at an end 208 of the cable 136. The wires 206 may be terminated to the internal circuit card 186 by soldering, by using one or more connectors (not shown), or the like. Alternatively, the internal circuit card 186 may be optically connected to optical fibers (not shown) of the cable 136. The communication system 100 provides a communication pathway that extends from the circuit board 102 to the internal circuit card 186 (or even beyond the circuit card 186 to the cable 136), and vice-versa, via the intervening communication connector 142.

The one or more electrical components 188 of the internal circuit card 186 are disposed along the top side 198 of the internal circuit card 186. Each electrical component 188 may be or include an electro-optic integrated circuit that converts electrical signals to optical signals and/or vice-versa, a resistor, a capacitor, a transistor, an inductor, an integrated circuit, an LED, or the like. Two electrical components 188 are shown in FIG. 3. The electrical components 188 generate heat during use. But, the electrical components 188 are enclosed within the cavity 138 of the pluggable module 106, which itself is within the receptacle cage 108. In order to dissipate heat from the pluggable module 106 to avoid heat-related performance degradation, the internal circuit board 186 is thermally coupled with the lower shell member 182 of the shell 130, and the lower shell member 182 is thermally coupled to the heat sink member 156.

The heat sink member 156 is mounted on the circuit board 102 such that the base plate 158 is between the circuit board 102 and the shell 130 of the pluggable module 106. The interface surface 160 engages and thermally couples to the bottom 146 of the shell 130 defined by the lower shell member 182. Heat from the internal circuit card 186 that is absorbed by the lower shell member 182 is transferred to the heat sink member 156 via the engagement between the bottom 146 of the shell 130 and the interface surface 160. The heat absorbed by the heat sink member 156 is transferred from the base plate 158 to the pin fins 164 that extend through the circuit board 102. Distal tips 210 of the pin fins 164 protrude beyond the bottom face 126 of the circuit board 102 and are exposed to the cooling fluid, denoted by the arrow 154. The cooling fluid 154 extracts heat from the distal tips 210 of the pin fins 164, thereby cooling the distal tips 210 and establishing a temperature gradient that draws heat from the relatively hot base plate 158 through the pin fins 164 to the relatively cooler distal tips 210.

In an embodiment, in order to promote thermal coupling between the shell 130 of the pluggable module 106 and the base plate 158 of the heat sink member 156, the receptacle cage 108 includes one or more biasing members 212 within the port 120. The one or more biasing members 212 are configured to urge the shell 130 in a direction towards the circuit board 102 (or, more specifically, towards the base plate 158 between the circuit board 102 and the shell 130). Thus, as the pluggable module 106 is received in the port 120, the one or more biasing members 212 apply a normal force on the shell 130 that urges the bottom 146 of the shell 130 into sustained mechanical engagement with the interface surface 160 of the base plate 158. The sustained mechanical engagement ensures a sufficient thermal coupling between the shell 130 and the heat sink member 156. In the illustrated embodiment, the one or more biasing members 212 are multiple ramps 212 that project into the port 120 from the top wall 116 of the receptacle cage 108. The ramps 212 engage the top 144 of the shell 130 and guide the shell 130 downwards towards the heat sink member 156. In other embodiments, instead of ramps, the biasing members 212 may be deflectable beams or other projections along the top wall 116, rails along the side walls 118 (shown in FIG. 1) of the receptacle cage 108 that guide the shell 130 downwards, a rotatable cam that forces the shell 130 downwards when engaged by the shell 130, or the like.

As an alternative or in addition to the one or more biasing members 212, a thermal interface material (not shown) may be disposed between the bottom 146 of the shell 130 and the interface surface 160 of the base plate 158 to maintain engagement and thermal coupling between the pluggable module 106 and the heat sink member 156. The thermal interface material may be a film, a pad, a grease, or the like. The thermal interface material is thermally conductive to provide a thermal path between the shell 130 and the base plate 158.

Figure 4:
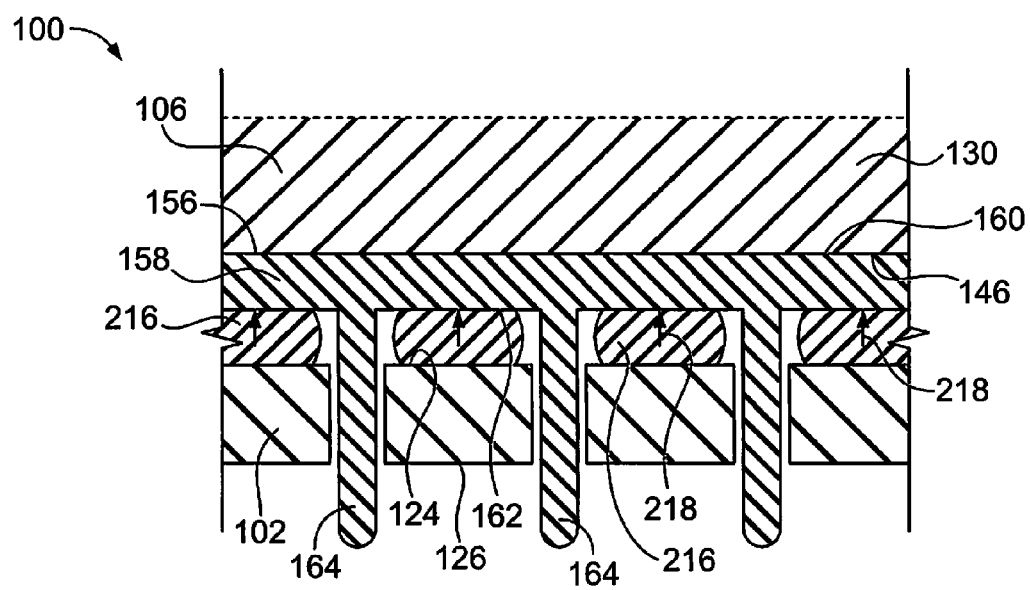
FIG. 4 is a close-up portion of the cross-sectional view of the communication system shown in FIG. 3 according to an alternative embodiment.

FIG. 4 is a close-up portion of the cross-sectional view of the communication system 100 shown in FIG. 3 according to an alternative embodiment. Instead of, or in addition to, the one or more biasing members 212 shown in FIG. 3 on the receptacle cage 108 (FIG. 3), the communication system 100 may include a compressible layer 216 that extends between the top face 124 of the circuit board 102 and the fin surface 162 of the heat sink member 156. The compressible layer 216 may extend laterally around the pin fins 164. The compressible layer 216 is configured to be compressed vertically as the pluggable module 106 is received in the port 120 (shown in FIG. 3) to allow the pluggable module 106 to be received within the port 120 between the base plate 158 and the top wall 116 (shown in FIG. 3) of the receptacle cage 108. In the compressed state, the compressible layer 216 is configured to apply a biasing force on the heat sink member 156 in an upward direction 218 towards the shell 130 of the pluggable module 106. The compressible layer 216 forces the base plate 158 in the upward direction 218 to ensure engagement and thermal coupling between the interface surface 160 and the bottom 146 of the shell 130. The compressible layer 216 may be formed of a compressible, rubber-like polymer material, one or more springs, or the like. The compressible layer 216 may be, but does not need to be, thermally conductive since the thermal heat path extends from the base plate 158 to the pin fins 164 before being rejected to the external environment along and/or beyond the bottom face 126 of the circuit board 102.

FIG. 5 is a perspective view of an alternative embodiment of the communication system 100. Unlike the embodiment shown in FIGS. 2-4, the embodiment shown in FIG. 5 does not include the discrete heat sink member 156 (shown in FIG. 2). In the illustrated embodiment, the heat dissipating fins 152 are directly coupled to the shell 130 of the pluggable module 106 and extend from the bottom 146 of the shell 130. The heat dissipating fins 152 are elongate blades 230 that extend lengthwise along the mating axis 191 for at least a portion of the length of the shell 130 between the mating end 132 and the cable end 134. The blades 230 may extend substantially the entire length of the shell 130. In an embodiment, the blades 230 extend parallel to one another along the lengths of the blades 230. The blades 230 are spaced apart from one another along the lateral axis 193 and define channels 232 between adjacent blades 230. The blades 230 optionally are oriented perpendicular to the bottom 146 of the shell 130. The shape and number of blades 230 are optional. The blades 230 may be formed integral with the lower shell member 182 of the shell 130, or alternatively may be fixed to the lower shell member 182 via soldering, laser-welding, or the like. In an alternative embodiment, the heat dissipating fins 152 may be pin fins, such as the pin fins 164 shown in FIG. 2, that are directly connected to the shell 130.

In the illustrated embodiment, the at least one opening 148 in the circuit board 102 is a bulk opening 234 that is configured to receive all of the heat dissipating fins 152 (for example, the blades 230) of the pluggable module 106 therein. The bulk opening 234 extends rearward along the mating axis 191 from the front edge 140 of the circuit board 102. The bulk opening 234 aligns with the port 120 of the receptacle cage 108 and extends toward the communication connector 142 (shown in FIG. 3) without extending into the connector mounting area 176 (FIG. 2). A width of the bulk opening 148 along the lateral axis 193 may be narrower than the width of the receptacle cage 108. For example, edge segments 236 of the circuit board 102, which define lateral edges 238 of the bulk opening 148, protrude laterally beyond the corresponding side walls 118 of the cage 108 towards a lateral center of the port 120. The pluggable module 106 within the port 120 is supported by the edge segments 236, which engage the bottom 146 of the shell 130. As the pluggable module 106 is loaded into the port 120 in a mating direction along the mating axis 191 from the front end 110 of the receptacle cage 108 towards the rear end 112, the blades 230 are received in the bulk opening 234 of the circuit board 102.

In an alternative embodiment, instead of a bulk opening 234, the at least one opening 148 may be multiple slots that extend parallel to each other along the mating axis 191 from the front edge 140 rearward. The slots are separated from one another by cantilevered fingers of the circuit board 102 having free ends that define portions of the front edge 140.

Figure 6:
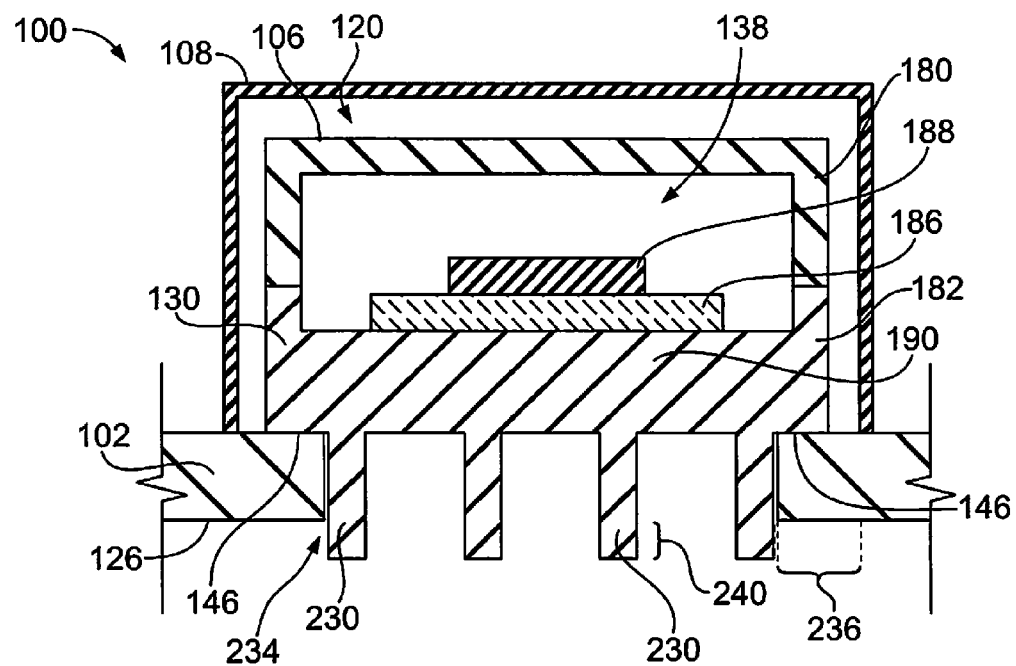
FIG. 6 is an end cross-sectional view of the embodiment of the communication system shown in FIG. 5 with the pluggable module loaded into a receptacle cage.

FIG. 6 is an end cross-sectional view of the embodiment of the communication system 100 shown in FIG. 5 with the pluggable module 106 loaded into the port 120 of the receptacle cage 108. When the pluggable module 106 is received in the port 120, the elongate blades 230 are commonly received in the bulk opening 234 of the circuit board 102. The edge segments 236 engage the bottom 146 of the shell 130 laterally outside of the outer blades 230, either directly or indirectly via a thermal interface material.

Distal tips 240 of the blades 230 protrude beyond the bottom face 126 of the circuit board 102 in order to transfer heat from the pluggable module 106 through the circuit board 102 to a cooling fluid (for example, air) external of the bottom face 126. For example, the internal circuit card 186 and heat-generating electrical components 188 thereon are located within the cavity 138 defined between the upper and lower shell members 180, 182. The lower shell member 182 includes the platform 190 that engages and is thermally coupled to the internal circuit card 186. The lower shell member 182 also includes the blades 230, which extend from the bottom 146 of the lower shell member 182. Therefore, the lower shell member 182 provides a direct heat conduction path from the internal circuit card 186 to the cooling fluid outside of the bottom face 126 of the circuit board 102. As a result, heat from the internal circuit card 186 is absorbed by the lower shell member 182 and transferred internally through the lower shell member 182 to the distal tips 240 of the blades 230, where the heat is discharged to the cooling fluid beyond to the bottom face 126 of the circuit board 102.

Figure 7:
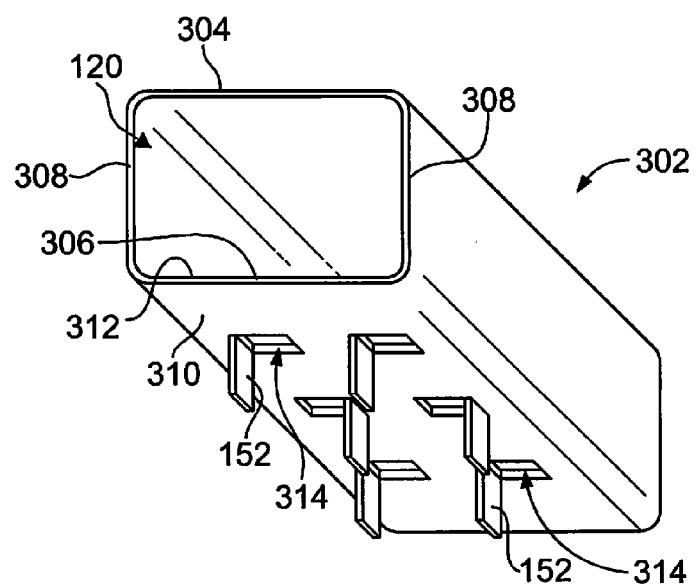
FIG. 7 is a perspective view of a receptacle cage of the communication system according to an alternative embodiment.

FIG. 7 is a perspective view of a receptacle cage 302 of the communication system 100 (shown in FIG. 1) according to an alternative embodiment. The receptacle cage 302 includes a top wall 304, a bottom wall 306, and side walls 308 that extend from the top wall 304 to the bottom wall 306. In the illustrated embodiment, the bottom wall 306 includes the heat dissipating fins 152 that are configured to extend through the openings 148 (shown in FIG. 1) of the circuit board 102 (FIG. 1). The fins 152 extend from a fin surface 310 of the bottom wall 306 that abuts the top face 124 (FIG. 1) of the circuit board 102. The bottom 146 (FIG. 1) of the pluggable module 106 (FIG. 1) that is received in the port 120 of the receptacle cage 302 engages and thermally couples to an interface surface 312 of the bottom wall 306 that is opposite the fin surface 310. Optionally, the receptacle cage 302 may be stamped and formed from a sheet or panel of metal. The fins 152 may be formed by stamping an outline of the fins 152 in the bottom wall 306 and subsequently bending the fins 152 out of the plane of the bottom wall 306, defining windows 314 along the bottom wall 306. The fins 152 may extend generally perpendicular to the bottom wall 306. The illustrated receptacle cage 302 may be used in the communication system in lieu of the heat sink member 156 shown in FIG. 2 or the pluggable module 106 with integral blades 230 that is shown in FIG. 5.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A communication system comprising:
   a receptacle cage having a plurality of walls defining a port that is configured to receive a pluggable module therein through a front end of the receptacle cage, the receptacle cage housing a communication connector at least proximate to a rear end of the receptacle cage, the communication connector configured to be electrically connected to the pluggable module received in the port, the receptacle cage further including a base plate having an interface surface and an opposite fin surface, the interface surface configured to engage and thermally couple to a bottom of the pluggable module within the port, the base plate including heat dissipating fins protruding from the fin surface; and
   a circuit board having a top face and an opposite bottom face, the receptacle cage being mounted on the top face of the circuit board, the communication connector within the receptacle cage being mounted on the top face and electrically connected to the circuit board, the circuit board defining multiple fin openings through the circuit board between the top and bottom faces in a port mounting area that aligns with the port of the receptacle cage, wherein the fin openings are spaced apart from edges of the circuit board, the heat dissipating fins of the base plate extending through the fin openings to transfer heat from the pluggable module through the circuit board to a cooling fluid beyond the bottom face of the circuit board.

2. The communication system of claim 1, wherein the walls of the receptacle cage are manufactured from a metal material and provide electrical shielding for the pluggable module and the communication connector.

3. The communication system of claim 1, wherein the walls of the receptacle cage include a top wall and side walls that extend from the top wall, the side walls extending to the top face of the circuit board and having mounting tails that extend into corresponding thru-holes of the circuit board for mounting the top wall and the side walls to the circuit board, the base plate of the receptacle cage comprising a heat sink member that is spaced apart from the side walls and separately mounted to the printed circuit board via the heat dissipating fins.

4. The communication system of claim 1, wherein the heat dissipating fins of the base plate are an array of pin fins and the fin openings in the circuit board are pin holes that accommodate the pin fins such that each of the pin fins is received in a corresponding one of the pin holes.

5. The communication system of claim 1, wherein the heat dissipating fins of the base plate are blades.

6. The communication system of claim 1, wherein the walls of the receptacle cage include a top wall and side walls that extend from the top wall to the top face of the circuit board, the receptacle cage including a biasing member within the port along at least one of the top wall or the side walls that forces the pluggable module received in the port towards the interface surface of the base plate.

7. The communication system of claim 1, wherein the walls of the receptacle cage include a top wall and two side walls that extend from the top wall to the base plate, the base plate defining a bottom wall of the receptacle cage that extends between the two side walls and is connected to each of side walls.

8. The communication system of claim 1, wherein the circuit board defines a connector mounting area rearward of the port mounting area, the connector mounting area including at least one of vias or contact pads for electrically connecting the communication connector to the circuit board.

9. The communication system of claim 1, further comprising the pluggable module received in the port of the receptacle cage, the pluggable module having an internal circuit card held in a thermally-conductive shell, the internal circuit card including one or more electrical components disposed thereon that generate heat, the shell configured to absorb heat from the internal circuit card and transfer the heat to a bottom of the shell.

10. A communication system comprising:
a circuit board having a top face and an opposite bottom face, the circuit board defining an array of pin holes extending through the circuit board in a port mounting area of the circuit board;
a receptacle cage mounted on the top face of the circuit board, the receptacle cage having a plurality of walls defining a port that is configured to receive a pluggable module therein through a front end of the receptacle cage, the port aligning with the port mounting area of the circuit board such that the pluggable module is received in the port above the at least one opening in the circuit board, the receptacle cage housing a communication connector at least proximate to a rear end of the receptacle cage, the communication connector configured to be electrically connected to the pluggable module received in the port; and
a heat sink member within the port of the receptacle cage, the heat sink member including a base plate having an interface surface and an opposite fin surface, the heat sink member having thermally-conductive heat dissipating fins that represent an array of pin fins protruding from the fin surface, the heat sink member mounted to the top face of the circuit board such that each of the pin fins is received in a corresponding one of the pin holes and protrudes beyond the bottom face of the circuit board, the interface surface engaging and thermally coupling to a bottom of the pluggable module received in the port for the heat sink member to transfer heat received from the pluggable module through the circuit board to a cooling fluid beyond the bottom face of the circuit board.

11. The communication system of claim 10, wherein the heat sink member is composed of a metal material and the heat dissipating fins are formed integral to the base plate.

12. The communication system of claim 10, wherein a compressible layer extends between the top face of the circuit board and the fin surface of the heat sink member around the heat dissipating fins, the compressible layer configured to be compressed vertically as the pluggable module is received in the port, the compressible layer configured to apply a biasing force on the heat sink member to ensure engagement between the interface surface of the heat sink member and the bottom of the pluggable module.

13. The communication system of claim 10, wherein the walls of the receptacle cage include a top wall and side walls that extend from the top wall to the top face of the circuit board, the receptacle cage including a biasing member within the port along at least one of the top wall or the side walls that urges the pluggable module received in the port into engagement with the interface surface of the heat sink member.

14. A communication system comprising:
a circuit board having a top face and an opposite bottom face, the circuit board defining at least one opening through the circuit board that extends rearward from a front edge of the circuit board in a port mounting area of the circuit board;
a receptacle cage mounted on the top face of the circuit board, the receptacle cage having a plurality of walls defining a port that aligns with the port mounting area of the circuit board, the receptacle cage housing a communication connector at least proximate to a rear end of the receptacle cage; and
a pluggable module received in the port of the receptacle cage through a front end thereof, the pluggable module configured to be electrically connected to the communication connector, the pluggable module having an internal circuit card held in a shell, the shell including heat dissipating fins that extend from a bottom of the shell, the heat dissipating fins being elongate blades that extend parallel to one another along at least a portion of a length of the pluggable module between a mating end and a cable end of the shell, wherein, as the pluggable module is loaded into the port in a mating direction from the front end of the receptacle cage, the elongate blades are received in the at least one opening of the circuit board, distal tips of the elongate blades protruding beyond the bottom face of the circuit board to transfer heat from the pluggable module through the circuit board to a cooling fluid beyond the bottom face of the circuit board.

15. The communication system of claim 14, wherein the at least one opening is a bulk opening that receives all of the elongate blades therethrough.

16. The communication system of claim 14, wherein the shell of the pluggable module is defined by a first shell member and a second shell member that engage one another at a seam and define a cavity that houses the internal circuit board, the second shell member defining the bottom of the shell and the heat dissipating fins that extend therefrom, the internal circuit board in the cavity of the shell engaging and thermally coupling to the second shell member such that heat from the internal circuit board is transferred directly through the second shell member to the cooling fluid along the bottom face of the circuit board.

17. The communication system of claim 14, wherein the internal circuit board of the pluggable module is electrically connected to an end of a cable to communicatively couple the cable to the internal circuit board, the internal circuit board including one or more electrical components disposed thereon, the pluggable module is configured to be electrically connected to the communication connector to communicatively couple the internal circuit board to the circuit board via the communication connector.

18. The communication system of claim 1, wherein a compressible layer extends between the top face of the circuit board and the fin surface of the base plate around the heat dissipating fins, the compressible layer configured to be compressed vertically as the pluggable module is received in the port, the compressible layer configured to apply a biasing force on the base plate to ensure engagement between the interface surface of the base plate and the bottom of the pluggable module.

19. The communication system of claim 10, wherein the front end of the receptacle cable is located at least proximate to a front edge of the circuit board, the pin holes in the array of pin holes of the circuit board being spaced apart from the front edge.

20. The communication system of claim 14, wherein the shell of the pluggable module is defined by an upper shell member and a lower shell member that engage one another at a seam and define a cavity that houses the internal circuit board therein, the heat dissipating fins formed integral to the lower shell member.

* * * * *